US012273169B2

(12) United States Patent
Niu et al.

(10) Patent No.: US 12,273,169 B2
(45) Date of Patent: Apr. 8, 2025

(54) DYNAMICALLY BEAMFORMED CONTROL CHANNEL FOR BEAMFORMED CELLS

(71) Applicant: Apple Inc., Cupertino, CA (US)

(72) Inventors: Huaning Niu, Milpitas, CA (US); Hyejung Jung, Palatine, IL (US); Gang Xiong, Beaverton, OR (US); Yushu Zhang, Beijing (CN); Hooman Shirani-Mehr, Portland, OR (US); Yuan Zhu, Beijing (CN); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/859,363

(22) Filed: Jul. 7, 2022

(65) Prior Publication Data

US 2022/0352943 A1    Nov. 3, 2022

Related U.S. Application Data

(62) Division of application No. 15/766,561, filed as application No. PCT/US2015/067071 on Dec. 21, 2015, now abandoned.

(Continued)

(51) Int. Cl.
*H04B 7/06* (2006.01)
*H04J 11/00* (2006.01)
(Continued)

(52) U.S. Cl.
CPC ............ *H04B 7/0617* (2013.01); *H04J 11/00* (2013.01); *H04L 5/00* (2013.01); *H04L 5/0048* (2013.01);
(Continued)

(58) Field of Classification Search
CPC ............... H04B 7/0617; H04W 72/23; H04W 36/0022; H04W 88/16; H04J 11/00;
(Continued)

(56) References Cited

U.S. PATENT DOCUMENTS 9,226,278 B2 * 12/2015 Chen ..................... H04L 1/1861
9,877,312 B2 * 1/2018 Kim ..................... H04B 7/0626
(Continued)

FOREIGN PATENT DOCUMENTS

CN    102916735 A    2/2013
CN    104303428 A    1/2015
(Continued)

OTHER PUBLICATIONS

Office Action in China Patent Application No. 201580082806.2, date mailed Jun. 18, 2020, 8 pgs.
(Continued)

*Primary Examiner* — Christopher M Crutchfield
*Assistant Examiner* — Tito Q Pham
(74) *Attorney, Agent, or Firm* — Kowert, Hood, Munyon, Rankin & Goetzel, P.C.

(57) ABSTRACT

Disclosed herein are apparatuses, systems, and methods using or implementing dynamic beamforming in control channels, by transmitting downlink control channels to user equipment (UEs) in a number of orthogonal frequency division multiplexing (OFDM) symbols of a downlink subframe. A first OFDM symbol of the number of OFDM symbols can be transmitted using first beamforming parameters in a first direction, and a second OFDM symbol of the number of OFDM symbols can be transmitted using second beamforming parameters different from the first beamforming parameters and in a second direction different from the first direction. The number of OFDM symbols used, as well
(Continued)

as other parameters, can be dynamically adjusted in subsequent subframes. Other embodiments are described.

20 Claims, 9 Drawing Sheets

Related U.S. Application Data

(60) Provisional application No. 62/238,606, filed on Oct. 7, 2015.

(51) Int. Cl.
*H04L 5/00* (2006.01)
*H04L 27/26* (2006.01)
*H04W 36/00* (2009.01)
*H04W 72/23* (2023.01)
*H04W 88/16* (2009.01)

(52) U.S. Cl.
CPC ........ *H04L 5/0051* (2013.01); *H04L 27/2602* (2013.01); *H04W 36/0022* (2013.01); *H04W 72/23* (2023.01); *H04W 88/16* (2013.01); *H04J 2011/0009* (2013.01); *H04J 2011/0096* (2013.01); *H04L 5/005* (2013.01)

(58) Field of Classification Search
CPC ...... H04J 2011/0009; H04J 2011/0096; H04L 5/00; H04L 5/0048; H04L 5/0051; H04L 27/2602; H04L 5/005
See application file for complete search history.

(56) References Cited

U.S. PATENT DOCUMENTS

| | | | |
|---|---|---|---|
| 10,609,697 B2 * | 3/2020 | Guo | H04W 72/0473 |
| 2004/0072545 A1 | 4/2004 | Hamalainen et al. | |
| 2004/0152415 A1 | 8/2004 | Anagnos | |
| 2008/0298224 A1 | 12/2008 | Pi et al. | |
| 2009/0175214 A1 | 7/2009 | Sfar et al. | |
| 2012/0076021 A1 * | 3/2012 | Sambhwani | H04W 36/0072 370/255 |
| 2012/0093118 A1 | 4/2012 | Peters | |
| 2012/0230211 A1 | 9/2012 | Sandberg et al. | |
| 2013/0039291 A1 | 2/2013 | Blankenship et al. | |
| 2013/0040682 A1 | 2/2013 | Chang et al. | |
| 2013/0089048 A1 | 4/2013 | Damnjanovic | |
| 2013/0156120 A1 | 6/2013 | Joslam et al. | |
| 2013/0196674 A1 | 8/2013 | Ahmadi | |
| 2013/0230013 A1 | 9/2013 | Seo et al. | |
| 2013/0286960 A1 | 10/2013 | Li et al. | |
| 2013/0286967 A1 * | 10/2013 | Ji | H04L 5/0053 370/329 |
| 2014/0092822 A1 | 4/2014 | Koorapaty et al. | |
| 2014/0098912 A1 | 4/2014 | Yin et al. | |
| 2014/0153427 A1 | 6/2014 | Seo et al. | |
| 2014/0177561 A1 * | 6/2014 | Yu | H04W 72/23 370/329 |
| 2014/0211731 A1 | 7/2014 | Inoue et al. | |
| 2014/0269623 A1 | 9/2014 | Sadek et al. | |
| 2014/0286297 A1 * | 9/2014 | Zhao | H04L 5/0053 370/329 |
| 2014/0307560 A1 | 10/2014 | Kim et al. | |
| 2014/0376652 A1 | 12/2014 | Sayana et al. | |
| 2015/0003360 A1 * | 1/2015 | Liu | H04L 5/0037 370/329 |
| 2015/0009948 A1 | 1/2015 | Raaf et al. | |
| 2015/0016379 A1 | 1/2015 | Nam et al. | |
| 2015/0043476 A1 | 2/2015 | Takeda et al. | |
| 2015/0055522 A1 | 2/2015 | Fu et al. | |
| 2015/0094076 A1 | 4/2015 | Inoue et al. | |
| 2015/0237624 A1 * | 8/2015 | Tang | H04W 72/0446 370/329 |
| 2015/0249526 A1 | 9/2015 | Kim et al. | |
| 2015/0263832 A1 | 9/2015 | Takeda et al. | |
| 2015/0333880 A1 | 11/2015 | Yi et al. | |
| 2016/0007361 A1 * | 1/2016 | Andersson | H04W 72/23 370/329 |
| 2016/0073392 A1 | 3/2016 | Byun et al. | |
| 2016/0080051 A1 * | 3/2016 | Sajadieh | H04W 12/02 375/267 |
| 2016/0112165 A1 * | 4/2016 | Ouyang | H04W 56/001 370/280 |
| 2016/0234706 A1 * | 8/2016 | Liu | H04L 27/2602 |
| 2016/0315680 A1 | 10/2016 | Braun et al. | |
| 2018/0041995 A1 * | 2/2018 | Fukui | H04B 7/0697 |
| 2018/0227890 A1 | 8/2018 | Shi et al. | |
| 2018/0242280 A1 | 8/2018 | Axmon et al. | |

FOREIGN PATENT DOCUMENTS

| | | | |
|---|---|---|---|
| KR | 1020150067212 | A | 6/2015 |
| TW | 201724889 | A | 7/2017 |
| WO | 2014007699 | A1 | 1/2014 |
| WO | 2014190823 | A1 | 12/2014 |
| WO | 2014193475 | A1 | 12/2014 |
| WO | 2015006939 | A1 | 1/2015 |
| WO | 2015021318 | A2 | 2/2015 |
| WO | 2015090828 | A1 | 6/2015 |
| WO | 2017062050 | A1 | 4/2017 |

OTHER PUBLICATIONS

"International Application Serial No. PCT/US2015/067071, International Search Report mailed Jun. 30, 2016", 6 pgs.
"International Application Serial No. PCT/US2015/067071, Written Opinion mailed Jun. 30, 2016", 11 pgs.
Office Action for TW Patent Application No. 111122145; Feb. 22, 2024.

* cited by examiner

DYNAMICALLY BEAMFORMED CONTROL CHANNEL FOR BEAMFORMED CELLS

CLAIM OF PRIORITY

This patent application is a divisional of U.S. patent application Ser. No. 15/766,561. filed on Apr. 6, 2018, which is a U.S. National Stage Filing under 35 U.S.C. 371 from International Application No. PCT/US2015/067071, filed on Dec. 21, 2015, and published as WO 2017/062050, which claims the benefit of U.S. Provisional Patent Application No. 62/238,606, filed Oct. 7, 2015, entitled "DYNAMICALLY BEAMFORMED PDCCH DESIGN FOR BEAMFORMED CELL", each of which are incorporated by reference herein in full.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to cellular communication networks including 3GPP (Third Generation Partnership Project) networks, 3GPP LIE (Long Term Evolution) networks, and 3GPP LTE-A (LTE Advanced) networks, although the scope of embodiments is not limited in this respect. Some embodiments pertain to 5G communications. Some embodiments relate to beamforming. Some embodiments relate to beamforming in millimeter wave systems.

BACKGROUND

As more and more people become users of mobile communication systems, there is an increasing need to utilize new frequency bands. Therefore, cellular communications has expanded into millimeter wave (mmWave) bands. There is an increasing need to provide high data rates and low latency in communications, including communications in mmWave bands.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
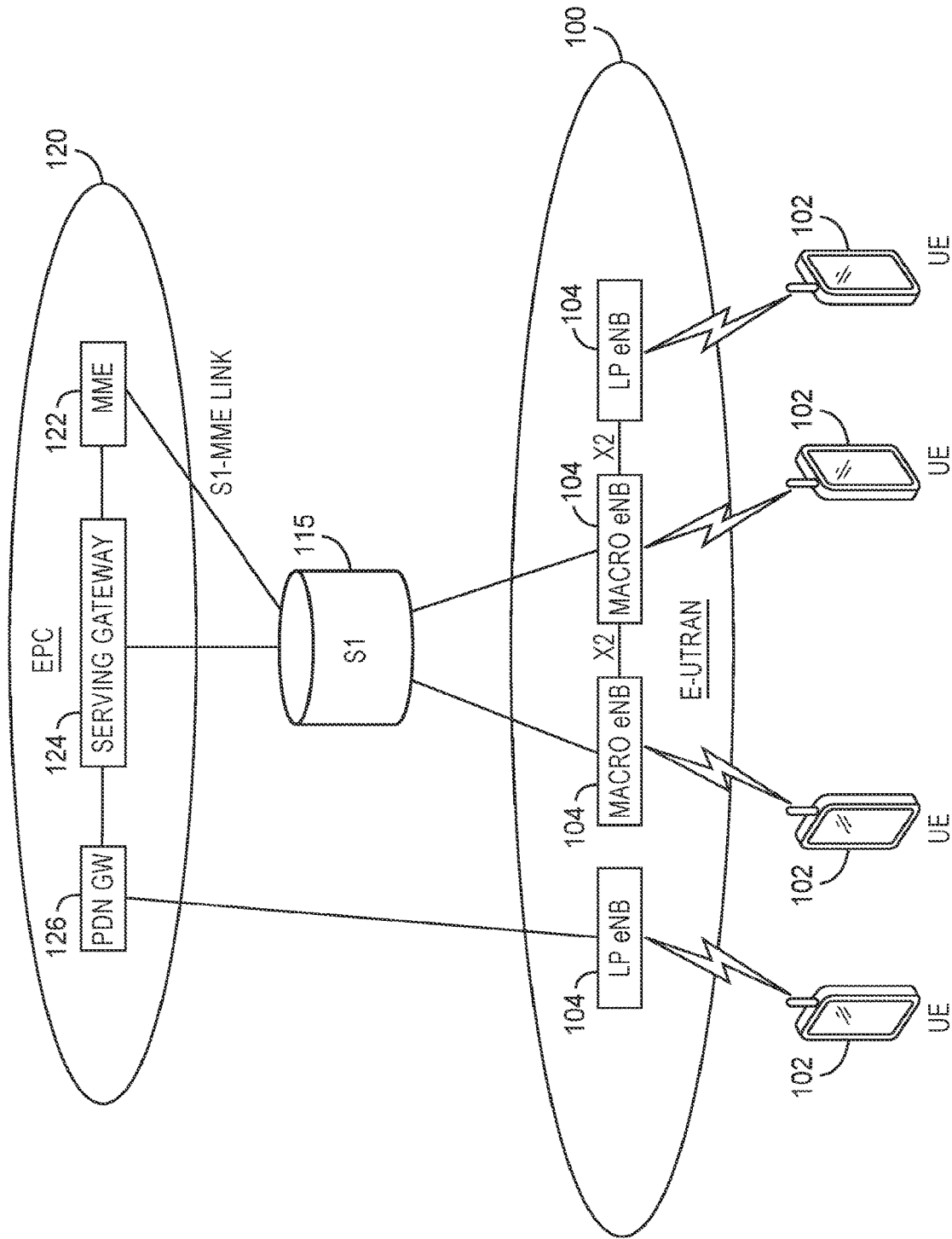
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126, The RAN 100 includes Evolved Node-B's (eNBs) 104 (which can operate as base stations) for communicating with User Equipment (UE) 102. The eNBs 104 can include macro eNBs and low power (LP) eNBs, In accordance with some embodiments, the eNB 104 can receive uplink data packets from the UE 102 on a Radio Resource Control (RRC) connection between the eNB 104 and the UE 102. The eNB 104 can transmit an RRC connection release message to the UE 102 to indicate a transition of the UE 102 to an RRC idle mode for the RRC connection. The eNB 104 can further receive additional uplink data packets according to the stored context information.

The MME 122 manages mobility aspects in access such as gateway selection and tracking area list management. The serving GW 124 terminates the interface toward the RAN 10, and routes data packets between the RAN 100 and the core network 120. In addition, it can be a local mobility anchor point for inter-eNB handovers and also can provide an anchor for inter-3GPP mobility. Other responsibilities may include lawful intercept, charging, and some policy enforcement. The serving GW 124 and the MME 122 can be implemented in one physical node or separate physical nodes. The PDN GW 126 terminates an SGi interface toward the packet data network (PDN). The PDN GW 126 routes data packets between the EPC 120 and the external PDN, and can be a key node for policy enforcement and charging data collection. It can also provide an anchor point for mobility with non-LTE accesses. The external PDN can be any kind of IP network, as well as an IP Multimedia Subsystem (IMS) domain. The PDN GW 126 and the serving GW 124 can be implemented in one physical node or separated physical nodes. Furthermore, the MME 122 and the Serving GW 124 can be collapsed into one physical node in which case the messages will need to be transferred with one less hop.

The eNBs 104 (macro and micro) terminate the air interface protocol and can be the first point of contact for a UE 102. In some embodiments, an eNB 104 can fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 can be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals can comprise a plurality of orthogonal subcarriers.

The S1 interface 115 is the interface that separates the RAN 100 and the EPC 120. It is split into two parts: the which carries traffic data between the eNBs 104 and the serving GW 124, and the S1-MME, which is a signaling interface between the eNBs 104 and the MIME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB can be implemented with a picocell eNB since it is coupled to a macro eNB via an X2 interface. Picocell eNBs or other LP eNBs can incorporate some or all functionality of a macro eNB. In some cases, this can be referred to as an access point base station or enterprise femtocell.

The eNB 103 and UE 102 can be configured to operate in a variety of frequency bands. Recently, mmWave bands have come into greater use. MmWaves are radio waves with wavelength in the range of 1 millimeter (mm)10 mm, which corresponds to a radio frequency of 30 Gigahertz (GHz)– 300 MmWaves exhibit unique propagation characteristics. For example, compared with lower frequency radio waves, mmWaves suffer higher propagation loss, and have a poorer ability to penetrate objects, such as buildings, walls, etc. On the other hand, due to the smaller wavelengths of the mmWaves, more antennas may be packed in a relatively small area, thereby allowing for the implementation of a high-gain antenna in small form factor.

Beamforming can address these and other concerns, and enable high data rate transmission over mmWave links. For data transmission, analog and digital beamformers are trained and optimized for physical downlink shared channel (PDSCH) transmission to ensure coverage and high data rates. It may be desirable to further provide beamforming for control channels, but some recent specifications and architecture changes have complicated this effort. For example, hybrid antenna architecture imposes a restriction on control channel beamforming design. With a hybrid antenna architecture design, the analog beamforming weight can be changed, at most, from one OFDM symbol to the next. Multiplexing multiple UEs in the same control region may reduce the beamforming performance.

Figure 2:
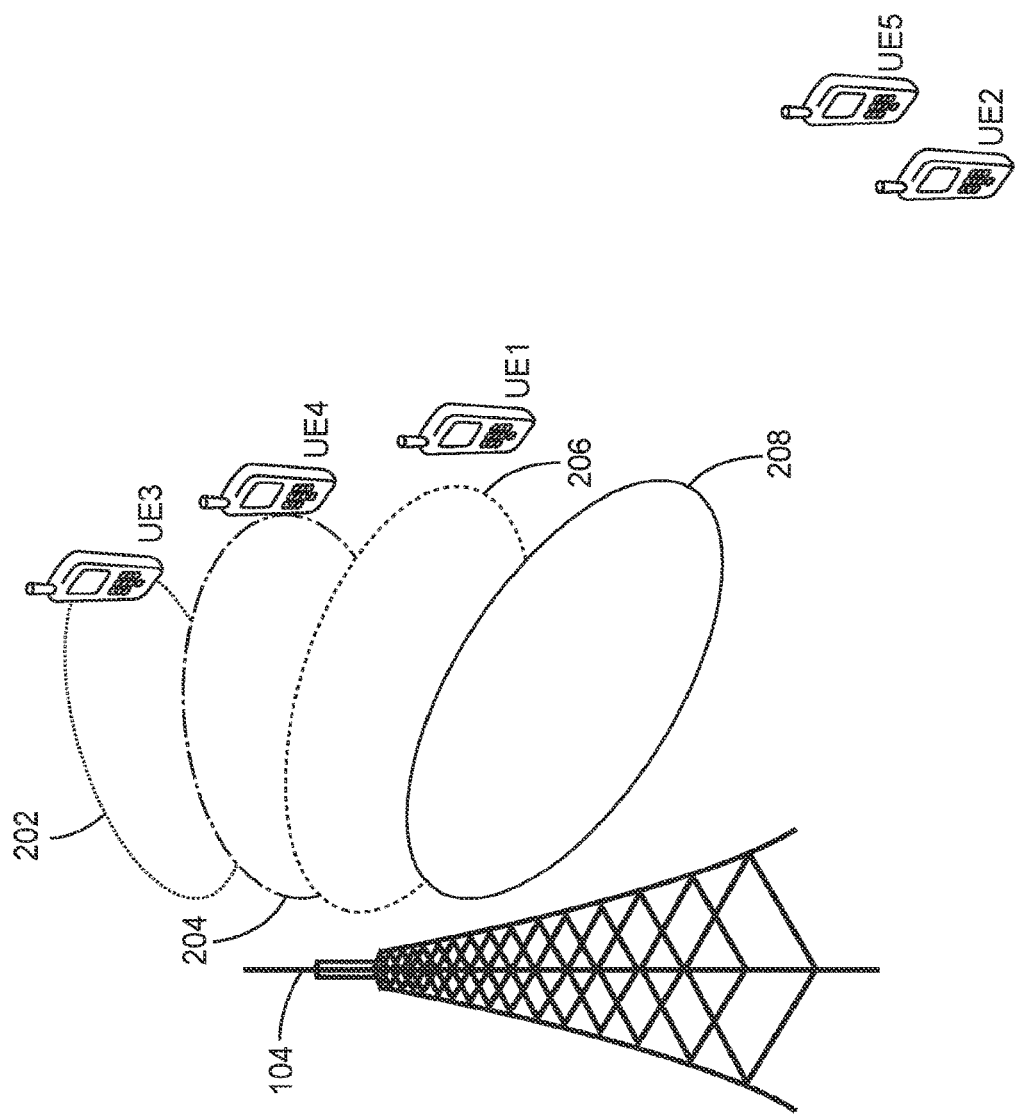
FIG. 2 illustrates an example of two groups of cellular users to illustrate concerns that can be addressed with some embodiments.

FIG. 2 illustrates an example of two groups of UEs 102, in order to illustrate issues that can arise with reduced beamforming, performance. In the illustrated cell served by eNB 104, UE1, UE3, and UE4 are at the cell center and are receiving downlink (DL) traffic, and UE2 and UE5 are close or at the cell edge and are transmitting uplink (UL) traffic. In the control region, the eNB 104 will transmit five DCIS (equivalently, five PDCCHs) to each of UE1, UE2, UE3, UE4, and UE5 to schedule the DL/UL data transmission, with different Tx beam directions. If the eNB 104 has a sub-array based hybrid beamforming architecture with four sub-arrays, each sub-array may need to form separate beam directions 202, 204, 206, and 208 to serve each of UE1, UE2, UE3, UE4, and UE5. The resources used to send PDCCH to UE2 and UE5 may dominate the control region, because of the reduced Tx beamforming gain.

Figure 3:
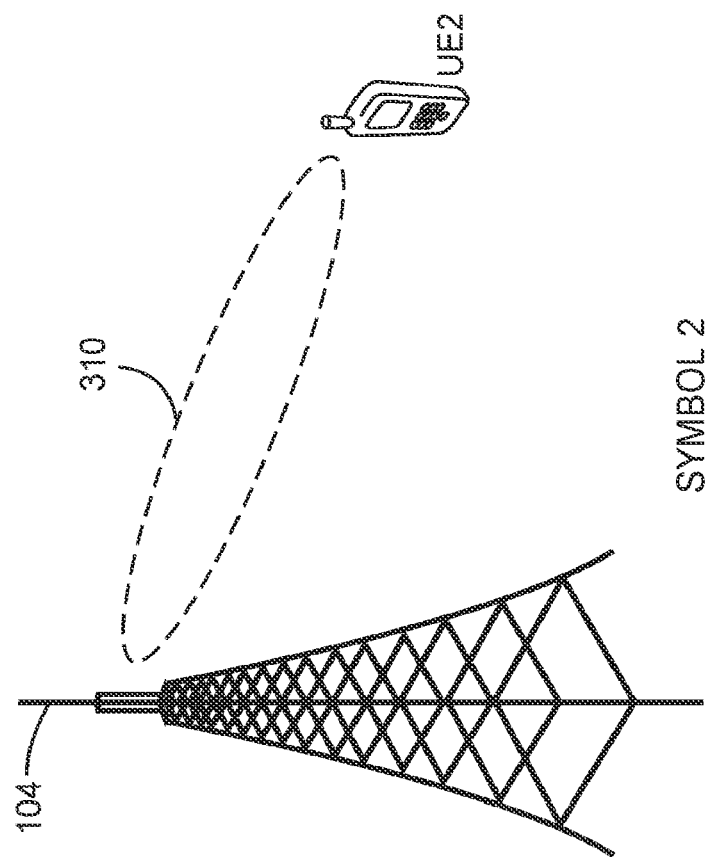
FIG. 3 illustrates an example of beamforming, in accordance with some embodiments.
Figure 3:
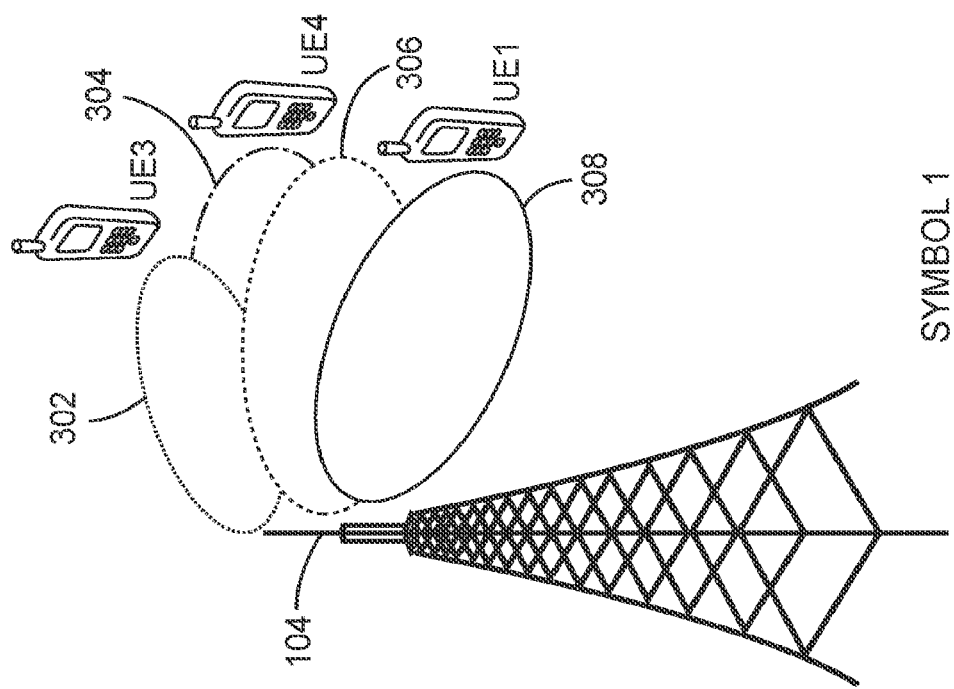

Apparatuses and methods in accordance with various embodiments address these challenges by providing transmission shown in FIG. 3, FIG. 3 illustrates an example of beamforming in accordance with some embodiments. In a practical sub-array based hybrid beamforming system, symbol-level time-division multiplexing (TDM) of multiple beams can support low geometry UEs 102 with full beamforming gains in some symbols, while allowing spatial multiplexing with multiple beam directions in other symbol. In OFDM symbol (or in discrete Fourier transform (DFT) spread OFDM (DFT-s-OFDM) symbol) 1, for example, spatial multiplexing with multiple beam directions 302, 304, 306 and 308 can be provided to support UE1, UE4, and UE3. In symbol 2, beam 310 can support low geometry UE2, Apparatuses and methods in accordance with various embodiments provide per-symbol control channel element (CCE) and resource element group (REG) mapping to the control channel. Embodiments can provide flexible analog and digital beamforming, and dynamic full flexible time-division duplexed (TDD) structure, with reduced signaling and control overhead. Control channels can be TDD with data channels or other channels in a same subframe.

Apparatuses and methods implemented in according with various embodiments can improve blind detection speed per UE 102. Because a UE 102 searches per OFDM symbol, the UE 102 can first pick the OFDM symbol or resources with maximum power (because the eNB 104 may be pointed to the UE 102 in that symbol), and then decode that OFDM symbol. Embodiments allow for adaptation of the control region size, from one to multiple symbols, without defining reference signals (RS) and CCE for each case. While embodiments are described referring to OFDM symbols, embodiments are not limited thereto and DFT-s-OFDM symbols may be included in some embodiments.

REG and CCE Formation

The format of REG and CCE depends on the subcarrier spacing and demodulation reference signal (DM-RS) pattern. Embodiments allow an eNB 104 to adjust the beam direction per symbol, because REGs are formed on a per-symbol basis.

Figure 4:
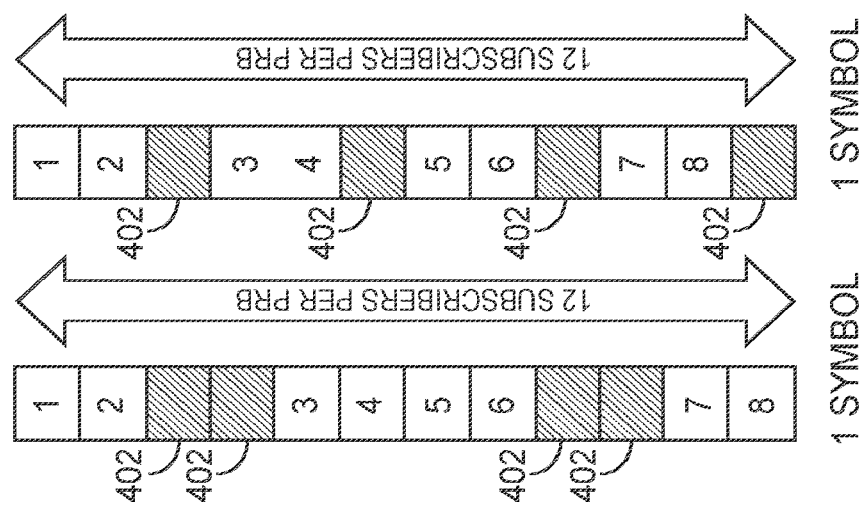
FIG. 4 illustrates resource element group (REG) design with 75 KHz subcarrier spacing in accordance with some embodiments.

FIG. 4 illustrates resource element group (REG) design with 75 KHz subcarrier spacing (14 OFDM symbols per 0.2 ms subframe) in accordance with some embodiments. One REG can contain eight resource elements (REs), spanning over a time-frequency resource unit of one OFDM symbol duration and 12 subcarriers. Four REs 402 are reserved for DM-RS, in each symbol with orthogonal cover codes of [1 1; 1 −1]. At least these embodiments support opportunistic multiuser (MU) transmission of PDCCHs with up to two streams. One example design of REG with DM-RS location is shown at 404, while another example of REG with DM-RS location is shown at 406. For example, one OFDM symbol can transmitted according to a DM-RS pattern in which four REs 402 are reserved for DM-RS, in two sets of two contiguous REs, and wherein four REs are reserved for other than DM-RS, between the two sets of contiguous REs. It will be appreciated that other REG formats and DM-RS patterns can be easily extended from the examples shown in FIG. 4. In some embodiments, a cell-specific frequency shift can be applied on the DM-RS pattern, to help reduce or eliminate time-frequency collisions from adjacent cells.

Figure 5:
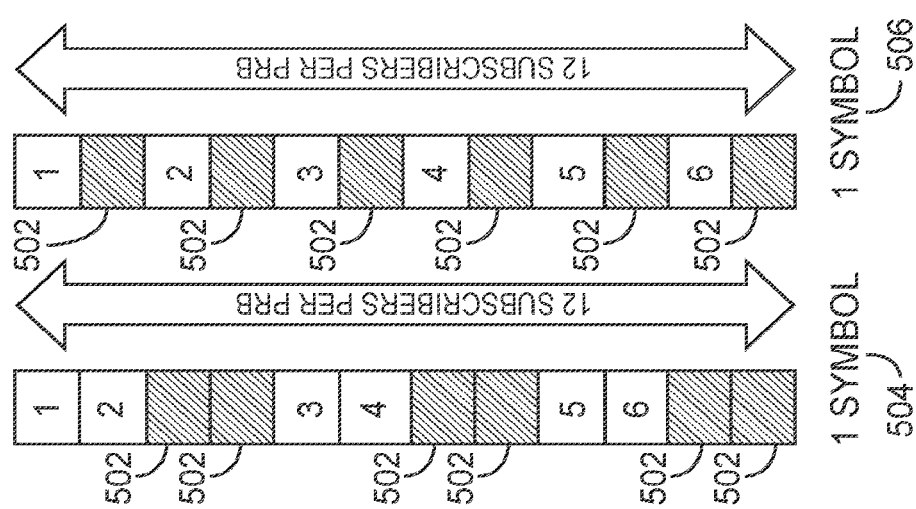
FIG. 5 illustrates one REG design with 750 kHz subcarrier spacing in accordance with some embodiments.

FIG. 5 illustrates a first example REG design with 750 kHz subcarrier spacing (70 OFDM symbols per 0.1 ms subframe) in accordance with some embodiments. One REG contains six REs, spanning over the time-frequency resource unit of OFDM symbol duration and twelve subcarriers. Six REs 502 are reserved for DM-RS in each symbol, with every two adjacent DM-RS having orthogonal cover codes of [1 1; 1 −1]. At least these embodiments support opportunistic MU transmission of PDCCHs with up to two streams. A first symbol 504 can have a first REG design as shown at 504, while another symbol 506 can have a different REG design as shown at 506. It will be appreciated that other REG formats and DM-RS patterns can be easily extended from the examples shown in FIG. 5. Upon a UE 102 entering or leaving the cell, or moving closer or further from the eNB 104, the number of OFDM symbols used for transmission of the control channels can be adjusted.

Figure 6:
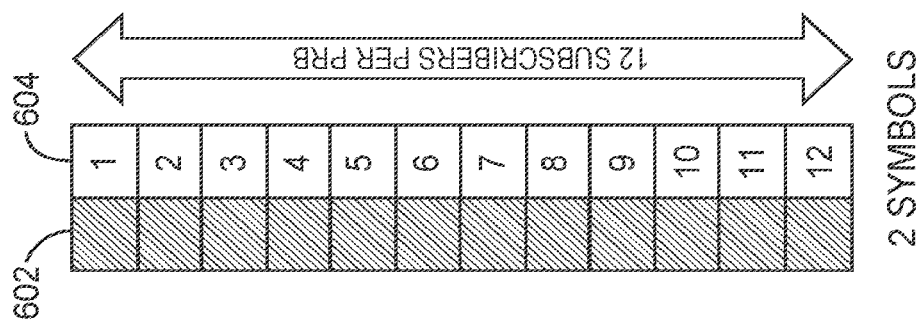
FIG. 6 illustrates another REG design with 750 kHz subcarrier spacing in accordance with some embodiments.

FIG. 6 illustrates another REG design with 750 kHz subcarrier spacing in accordance with some embodiments. FIG. 6 illustrates design with single carrier waveform, such that the REG spans for two symbols, where one symbol 602 is used for RS, and the other symbol is used for control channel (e.g., PDCCH, ePDCCH, xPDCCH, etc.) transmission. Every four adjacent DM-RS are grouped together, with cover code of:

$$[1 \quad 1 \quad 1 \quad 1$$
$$1 \quad -1 \quad 1 \quad -1$$
$$1 \quad 1 \quad -1 \quad -1$$
$$1 \quad -1 \quad -1 \quad 1]$$

At least these embodiments support opportunistic MU transmission of PDCCH with up to four streams.

Embodiments described herein support distributed and localized REG to CCE mappings, and multiple CCE aggregation levels. Localized REG mapping is used for UE-specific DCI. A CCE is composed of multiple REGs within adjacent RBs in the same symbol. Distributed REG mapping is used to transmit cell specific control information or UE-specific scheduling information. Distributed REG mapping can be employed when closed loop beamforming is not available.

Indication of the DL Control Region Size

The size of the DL control region can changed dynamically based on cell conditions, for example, the number of UEs 102 scheduled in a transmission time interval (TTI). A UE 102 uses the size of control region to determine the symbol at which to begin decoding the PDSCH. Embodiments provide mechanisms for signaling the size of the control region to the UE 102.

In at least some embodiments, the eNB 104 can transmit control region size information in UE-specific DCI. At least these embodiments may be used when control region size changes often, or more dynamically. For UEs 102 allocated in a TTI, after correctly decoding the DCI, the starting position of PDSCH can be derived accordingly. In some embodiments, control region size information can be transmitted in a 3-bit field in the UE-specific DCI, although embodiments are not limited to any particular size for the control region size information field. UEs 102 not allocated in the TTI can perform a blind search for the maximum allowed control region size (e.g., for a maximum of eight symbols in 750 KHz subcarrier design, or three symbols in 75 kHz subcarrier design). If no DCI is found, in at least these embodiments, the UE 102 can enter power save until a subsequent TTI, and then re-perform the blind search. The maximum allowed control region size can be predefined or configured by higher layers in a master system information block (MIB), a system information block (SIB), or in dedicated RRC signaling.

In another embodiment, a synchronization signal can be used to indicate the control region size. At least these embodiments may be used when control region size changes less often (e.g., is semi-static). In at least these embodiments, a control format indicator (CFI) channel may be mapped to the central $N_{CFI}^{SC}$ subcarriers repeatedly in each control channel OFDM symbol. This synchronization signal for indicating control region size may have a base sequence at least somewhat similar to LTE secondary synchronization signals (SSS), and the root index may be used to carry the CFI value information. The CFI channel signal in each symbol may use the same beamforming weight as the control channel. Accordingly, a UE 102 may ignore control channel symbols with channel energy below a threshold, and decode the CFI channel or control channel correctly to reduce or eliminate blind detection.

ILLUSTRATIVE EXAMPLES

In embodiments, a UE 102 can use previous trained Rx beamforming rig to receive the control channel. The eNB 104 can use different beamforming schemes as described below.

For example, in some embodiments, the eNB 104 can transmit multiple control channels intended for multiple UEs 102 in different beam directions by employing DL multiple-user multiple-input multiple-output (MU-MIMO) transmission, while the DL digital beamforming is trained through either channel state information reference signals (CSI-RS) or sounding RS.

In other embodiments, the eNB 104 can transmit multiple control channels to multiple UEs 102 at a same or similar direction from the eNB 104, to maximize or enhance Tx beamforming gain. These embodiments are illustrated by FIG. 7.

Figure 7:
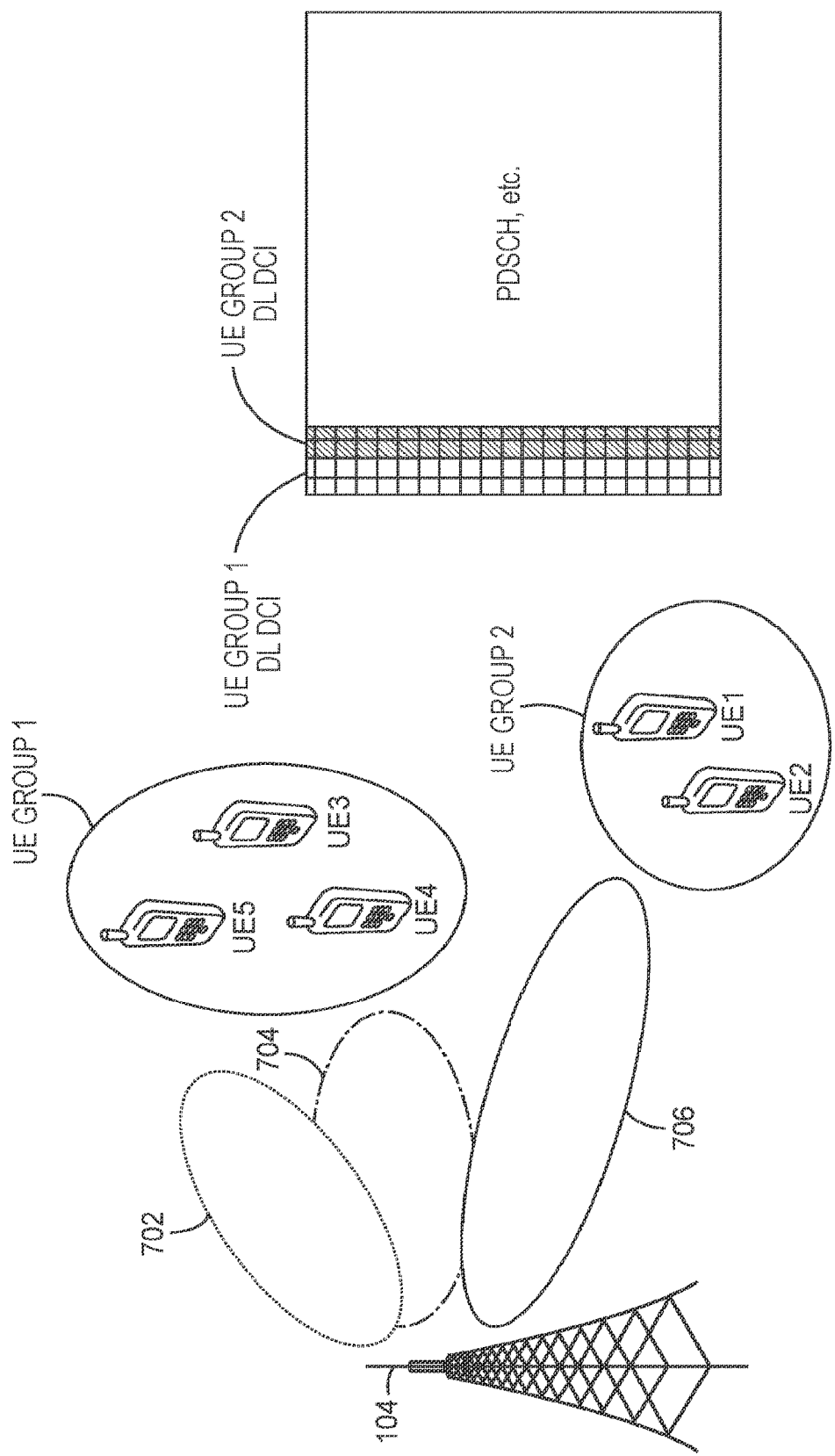
FIG. 7 illustrates symbol-level time multiplexed control channel transmission according to geometry and direction-based UE grouping in accordance with some embodiments.

FIG. 7 illustrates symbol-level time multiplexed control channel transmission according to geometry and direction-based UE grouping in accordance with some embodiments. As shown in FIG. 7, an eNB 104 can group UEs according to their estimated signal to noise ratio (SINR) (or geometry) and beam directions. The eNB 104 can then transmit UE-specific control channels according to the user grouping. For example, UE1 and UE2 can be low geometry UEs, which require a high beamforming gain, while UE3, UE4 and UE5 can be high geometry UEs, which can support MU MIMO. To accommodate different required beamforming gains and beam directions, UE group 1 and UE group 2 are allocated in different symbols for control channel transmission in beam directions 702, 704, and 706 with same or different aggregation levels. For example, a higher aggregation level may be used for transmission to UE group 2. UE1 and UE2, therefore, may only decode the DL DCI symbol or symbols for UE group 2 because that symbol or group of symbols will have higher energy compared to symbols for UE group 1. In other embodiments, as described earlier herein, any or all of UE1, UE2, UE3, UE4, and UE5 may scan up to a maximum number of symbols to decode the control channel and to determine where PDSCH may start.

Figure 8:
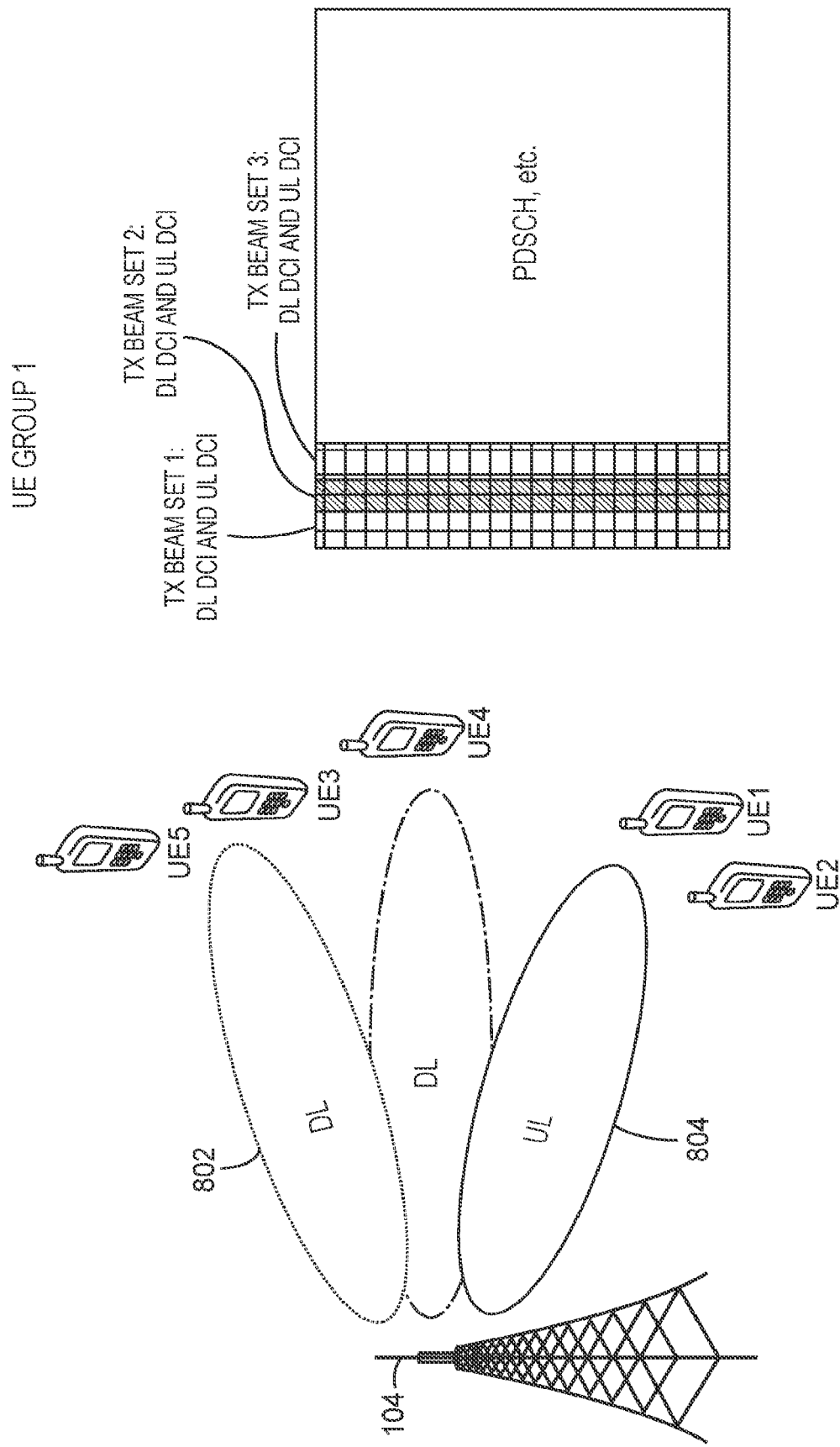
FIG. 8 illustrates evolved Node-B (eNB) scheduling of downlink control information (DCI) transmission based on different beam directions in accordance with some embodiments.

In some embodiments, eNB 104 can schedule multiple UEs 102 in one or more beam directions including DL DCI and UL DCI, as shown in FIG. 8. As shown in FIG. 8, one symbol can be sent to multiple beam directions simultaneously, for example, if different UEs 102 are expected to receive at each beam direction. For example. Tx beam set 1 can be sent in beam direction 802 and 804 simultaneously. The example embodiments illustrated in FIG. 8 can be implemented by the eNB 104 at least because UE1 and UE2, which are UL users, will typically not be the same users as downlink users UE3, UE4, and UE5. Similar other Tx beam sets can be included, for example, the eNB 104 can also transmit Tx beam set 2 and Tx beam set 3 to other groups simultaneously.

In the above embodiments, DM-RS can be scrambled with a UE-specific sequence, and a DM-RS port association rule similar to ePDCCH can be used. For DL transmission from multiple transmission points, one DM-RS port is associated, and the aggregated channel is estimated for decoding. A UE 102 can perform blind search per symbol, with a similar search space per symbol. Alternatively, in some embodiments, the UE search space may be designed according to:

$$L \left\{ \Delta_{CCE} \bmod \frac{N_{CCE}}{L} \right\} + i$$

where $\Delta_{CCE}$ denotes the UE-specific CCE offset, which may be configured via dedicated RRC signaling, $N_{CCE}$ is the number of CCEs in a subframe, and L is the aggregation level. The control channel symbol for one UE 102 may be different in different subframes to achieve the diversity gain.

Apparatuses for Performing Various Embodiments

Figure 9:
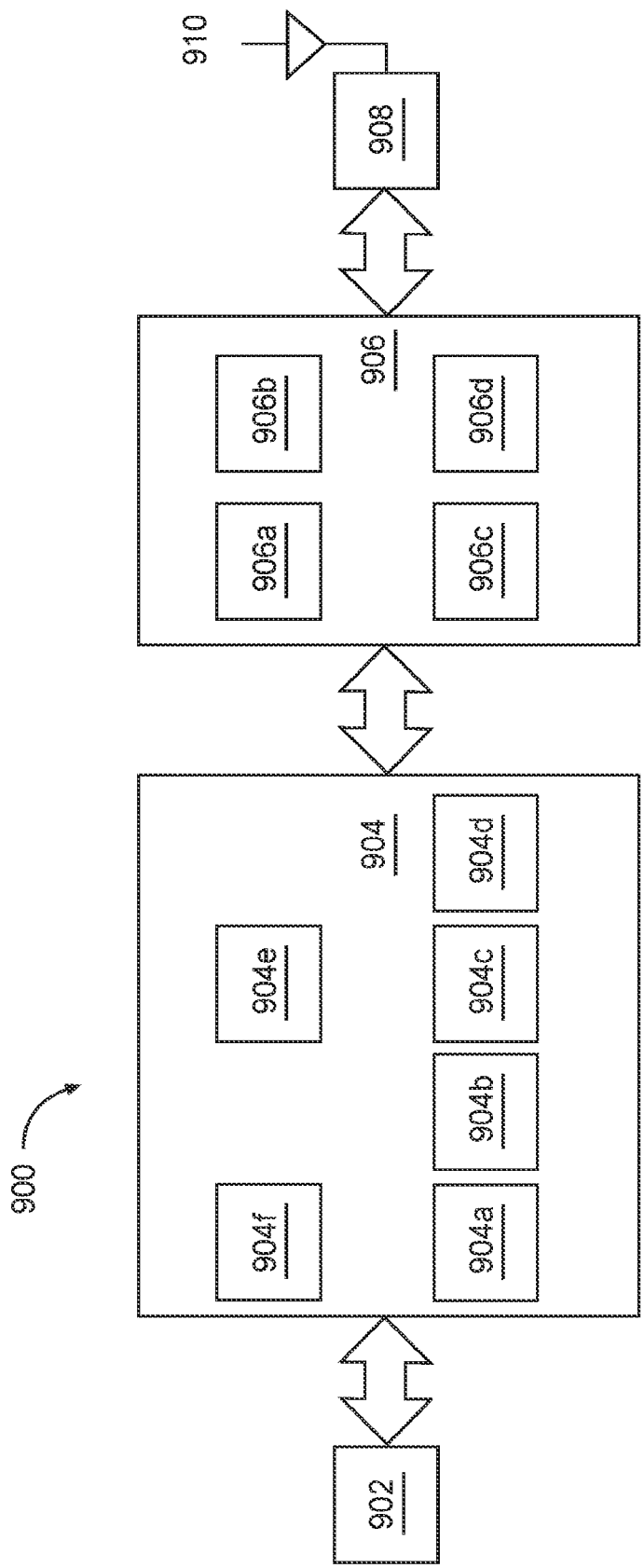
FIG. 9 is a functional diagram of a User Equipment (UE) in accordance with some embodiments.

FIG. 9 is a functional diagram of a User Equipment (UE) 900 in accordance with some embodiments. The UE 900 may be suitable for use as a UE 102 as depicted in FIG. 1. In some embodiments, the UE 900 may include application circuitry 902, baseband circuitry 904, Radio Frequency (RF) circuitry 906, front-end module (FEM) circuitry 908 and one or more antennas 910, coupled together at least as shown. In some embodiments, other circuitry or arrangements may include one or more elements and/or components of the application circuitry 902, the baseband circuitry 904, the RF circuitry 906 and/or the FEM circuitry 908, and may also include other elements and/or components in some cases. As an example, "processing circuitry" may include one or more elements and/or components, some or all of which may be included in the application circuitry 902 and/or the baseband circuitry 904. As another example, "transceiver circuitry" may include one or more elements and/or components, some or all of which may be included in the RF circuitry 906 and/or the FEM circuitry 908. These examples are not limiting, however, as the processing circuitry and/or the transceiver circuitry may also include other elements and/or components in some cases.

In embodiments, the processing circuitry can configure the transceiver circuitry to scan a number of OFDM symbols of a downlink subframe to detect the highest-energy OFDM symbol of the number of OFDM symbols. The processing circuitry can configure the transceiver circuitry to receive a value for the number of OFDM symbols to be scanned, wherein the value is provided in other than a Physical Hybrid-ARQ Indicator Channel (PHICH). For example, the value for the number of OFDM symbols to be scanned may be received in DCI or in a synchronization signal. When a relative distance to the eNB 104 changes, the hardware processing circuitry may further configure the transceiver circuitry to rescan the number of OFDM symbols to detect whether the highest-energy OFDM symbol has changed. When the UE 900 does not receive a value for the number of OFDM symbols, the hardware processing circuitry may further configure the transceiver circuitry to blind search up to a threshold number of OFDM symbols to detect control channel information.

The processing circuitry can configure the transceiver circuitry to decode a downlink control channel, in the highest-energy OFDM symbol. In embodiments, the downlink control channel may be received in no more than one OFDM symbol from the eNB 104.

In some embodiments, the UE 900 may receive UL-formatted DCI in a first OFDM symbol of the number of OFDM symbols and DL DCI in a different OFDM symbol than the first OFDM symbol.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband circuity 904 may interface with the application circuitry 902 for generation and processing of the baseband signals and for controlling operations of the RF circuitry 906. For example, in sonic embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect. In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In sonic embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906. In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider. The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer. In some embodiments, frequency input may be provided by a voltage-controlled oscillator (VCO), although that is not a requirement. Divider control input may be provided by either the baseband circuitry 904 or the application circuitry 902 depending on the desired output frequency. In some embodiments, a divider control input N) may be determined from a look-up table based on a channel indicated by the application circuitry 902.

Synthesizer circuitry 906d of the RE circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910. In some embodiments, the UE 900 may include additional elements such as, for example, memory/storage, display, camera, sensor, and/or input/output (I/O) interface.

Figure 10:
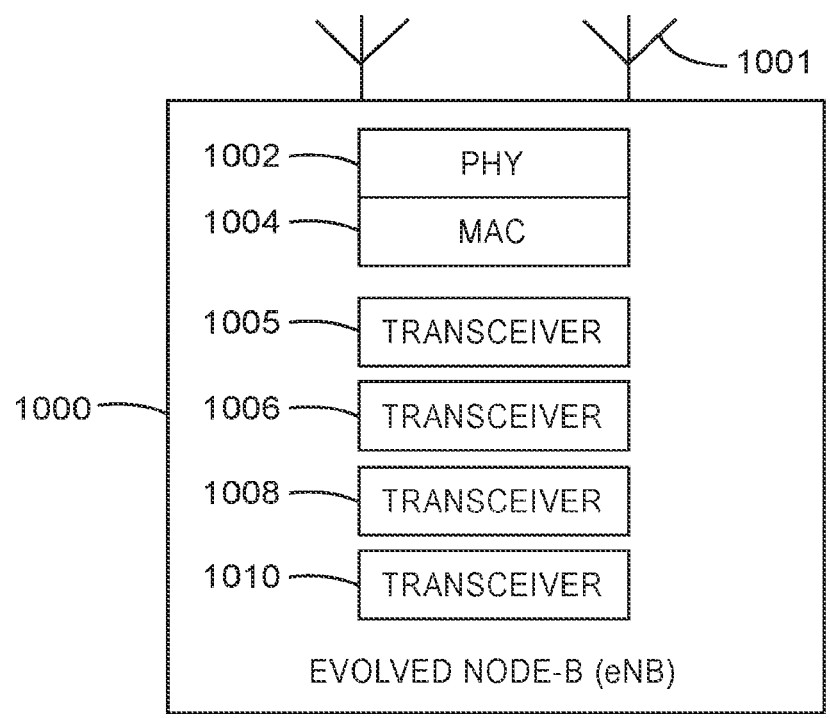
FIG. 10 is a functional diagram of an Evolved Node-B (eNB) in accordance with some embodiments.

FIG. 10 is a functional diagram of an Evolved Node-B (eNB) 1000 in accordance with some embodiments. It should be noted that in some embodiments, the eNB 1000 may be a stationary non-mobile device. The eNB 1000 may be suitable for use as an eNB 104 as depicted in FIG. 1. The eNB 1000 may include physical layer circuitry 1002 and a transceiver 1005, one or both of which may enable transmission and reception of signals to and from the UE 900, other eNBs, other UEs or other devices using one or more antennas 1001. As an example, the physical layer circuitry 1002 may perform various encoding and decoding functions that may include formation of baseband signals for transmission and decoding of received signals. As another example, the transceiver 1005 may perform various transmission and reception functions such as conversion of signals between a baseband range and a Radio Frequency (RF) range. Accordingly, the physical layer circuitry 1002 and the transceiver 1005 may be separate components or may be part of a combined component. In addition, some of the functionality described may be performed by a combination that may include one, any or all of the physical layer circuitry 1002, the transceiver 1005, and other components or layers.

In some embodiments, the transceiver 1005 can transmit downlink control channels to UEs 102, 900 (FIGS. 1, 9) in OFDM symbols (or discrete Fourier Transform (DFT) spread OFDM (DFT-s-OFDM) symbols of a downlink subframe. A first OFDM symbol of the number of OFDM symbols can be transmitted using first beamforming parameters, and a second OFDM symbol of the number of OFDM symbols can be transmitted using second beamforming parameters different from the first beamforming parameters. In embodiments, any or all of these downlink control channels can be transmitted in no more than one OFDM symbol, although embodiments are not limited thereto. It will be appreciated that any number of control channels can be transmitted, and embodiments are not limited to two control channels. For example, only one control channel may be transmitted, or three or more control channels can be transmitted.

Any or all of the OFDM symbols in the control region can be transmitted with different DM-RS patterns as described earlier herein with reference to at least FIGS. 4-6. For example, a first OFDM symbol can be transmitted according to a first DM-RS pattern and the second OFDM symbol can be transmitted according to a second DM-RS pattern different from the first DM-RS pattern, In some embodiments, the second DM-RS pattern can be varied from the first DM-RS pattern according to a cell-specific frequency shift pattern. In some embodiments, at least one OFDM symbol can include only reference signals (RSs).

In some embodiments, one OFDM symbol can be transmitted in a first beam direction and another OFDM symbol can be transmitted in a second beam direction different from the first beam direction. In at least these embodiments, the UEs 102 in a cell served by the eNB 1000 can be divided into at least two groups based on proximity to the cell edge. The eNB 1000 can transmit the first OFDM symbol to one of the at least two groups and the second OFDM symbol to another of the at least two groups.

In embodiments, the eNB 1000 can transmit a UL-formatted downlink control indicator (DCI) in a first beam direction on a first OFDM symbol and a downlink DCI in a second direction and in the first OFDM symbol.

The eNB 1000 may also include medium access control layer (MAC) circuitry 1004 for controlling access to the wireless medium. The antennas 910, 1001 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 910, 1001 may be effectively separated to take advantage of spatial diversity and the different channel characteristics that may result. In FD MIMO embodiments, a two-dimensional planar antenna array structure may be used, and the antenna elements are placed in the vertical and horizontal direction as described earlier herein.

In some embodiments, the UE 900 or the eNB 1000 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly, In some embodiments, the UE 900 or eNB 1000 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 900, eNB 1000 or other device may include one or more of a keyboard, a display, a non-volatile memory port, multiple antennas, a graphics processor, an application processor, speakers, and other mobile device elements. The display may be an LCD screen including a touch screen.

Figure 11:
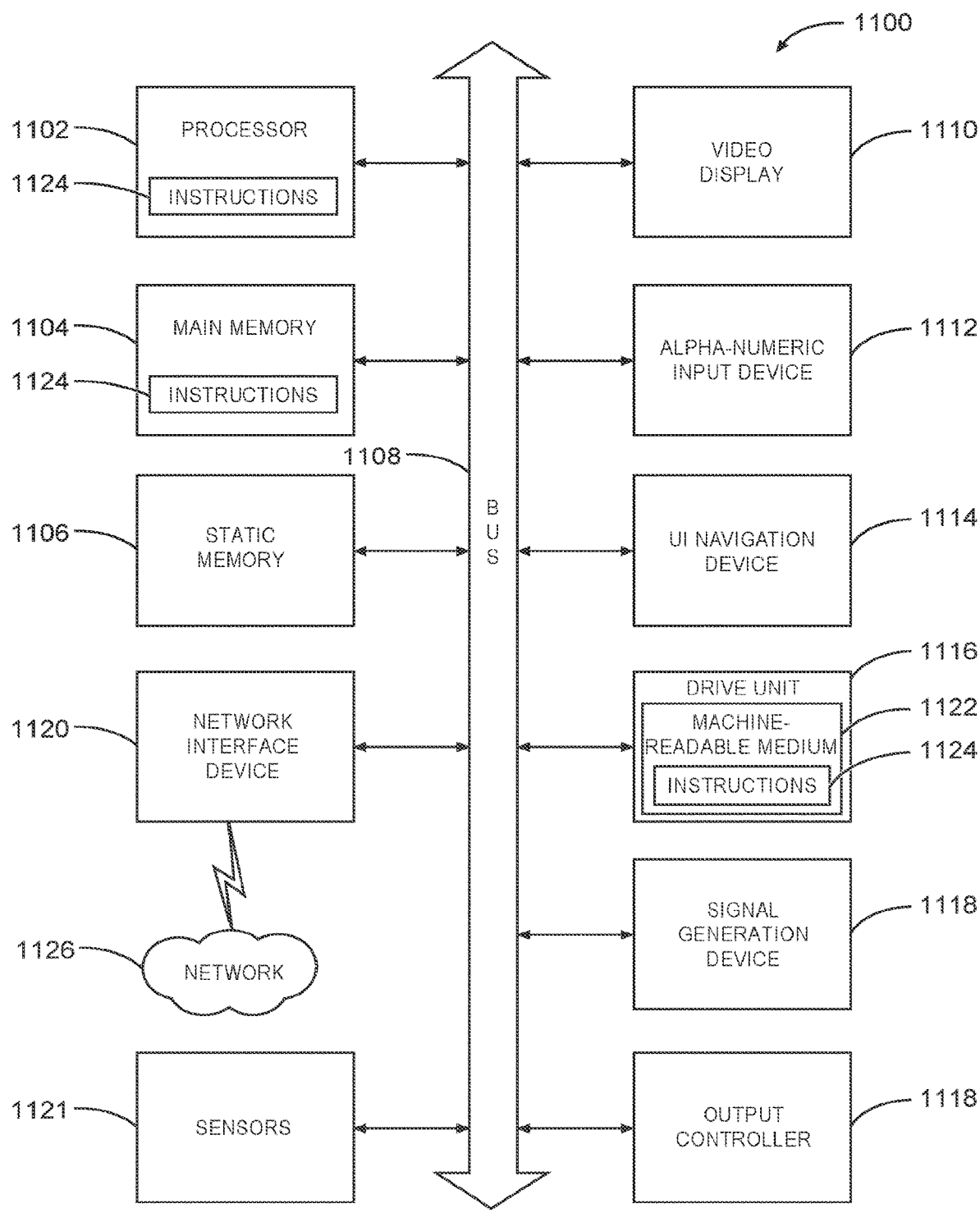
FIG. 11 is a block diagram illustrating components of a machine, according to some example embodiments, able to read instructions from a machine-readable medium and perform any one or more of the methodologies discussed herein, in accordance with some embodiments.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a UE, eNB, MME, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a computer-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a computer-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute computer-readable media.

While the computer-readable medium 1122 is illustrated as a single medium, the term "computer-readable medium" may include a single medium or multiple media (e.g., a centralized or distributed database, and/or associated caches and servers) configured to store the one or more instructions 1124. When the machine 1100 operates as an eNB, the computer-readable medium 1122 can instruct one or more processors of the eNB to detect locations for user equipments (UEs) in a cell served by the eNB; and transmit downlink control channels to the UEs in a number orthogonal frequency division multiplexing (OFDM) symbols of a downlink subframe, the number being set based on at least one of cell load and locations for the plurality of UEs.

The term "computer-readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting computer-readable medium examples may include solid-state memories, and optical and magnetic media. Specific examples of computer-readable media may include: non-volatile memory, such as semiconductor memory devices (e.g., Electrically Programmable Read-Only Memory (EPROM), Electrically.

Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, computer-readable media may include non-transitory computer-readable media. In some examples, computer-readable media may include computer-readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), MIMO, FD-MIMO, or multiple-input single-output (MTSO) techniques. In some examples, the network interface device 1120 may wirelessly communicate using FD-MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

To better illustrate the apparatuses, systems, and methods disclosed herein, a non-limiting list of examples is provided herein:

In Example 1, for an Evolved Node-B (eNB), the apparatus comprising hardware processing circuitry and transceiver circuitry, the hardware processing circuitry to configure the transceiver circuitry to: transmit downlink control channels to user equipment (UEs) in orthogonal frequency division multiplexing (OFDM) symbols of a downlink subframe, a first of the OFDM symbols configured to be transmitted using first beamforming parameters in a first direction, and a second of the OFDM symbols is configured to be transmitted using second beamforming parameters different from the first beamforming parameters and in a second direction different from the first direction.

In Example 2, the subject matter of Example 1 can optionally include wherein the eNB is configured to dynamically adjust beam direction of the OFDM symbols in subsequent subframes based on cell conditions in a cell served by the eNB.

In Example 3, the subject matter of any of Examples 1-2 can optionally include wherein a search space for a downlink control channel is limited to one OFDM symbol.

In Example 4, the subject matter of any of Examples 1-3 can optionally include wherein the first OFDM symbol is transmitted according to a demodulation reference signal (DM-RS) pattern in which four resource elements (REs) are reserved for DM-RS, in two sets of two contiguous REs, and wherein four REs are reserved for other than DM-RS between the two sets of contiguous REs.

In Example 5, the subject matter of Example 4 can optionally include wherein the second DM-RS pattern is varied from the first DM-RS pattern according to a cell-specific frequency shift pattern.

In Example 6, the subject matter of any of Examples 1-2 can optionally include wherein the hardware processing circuitry is further to configure the transceiver circuitry to transmit the first OFDM symbol to a first group of UEs close to the cell edge and the second OFDM symbol to a second group of UEs further from the cell edge than is the first group of UEs.

In Example 7, the subject matter of any of Examples 1-6 can optionally include wherein the hardware processing circuitry is further to configure the transceiver circuitry to transmit an uplink-formatted downlink control indicator (DCI) in a first analog beam direction on a first OFDM symbol and a downlink DCI in a second direction and in the first OFDM symbol.

In Example 8, the subject matter of any of Examples 1-7 can optionally include wherein the hardware processing circuitry is further to configure the transceiver circuitry to transmit, in UE-specific DCI, an indication of the number of OFDM symbols in which the control channels are to transmitted.

In Example 9, the subject matter of Example 8 can optionally include wherein the hardware processing circuitry is further to configure the transceiver circuitry to dynamically adjust, between subframes, the number of OFDM symbols in which the control channels are to be transmitted.

In Example 10, the subject matter of any of Examples 1-9 can optionally include wherein the hardware processing circuitry is further to configure the transceiver circuitry to transmit, in a secondary synchronization signal (SSS), an indication of the number of OFDM symbols in which the control channels are to be transmitted.

In Example 11, the subject matter of any of Examples 1-10 can optionally include wherein the hardware processing circuitry is further to configure the transceiver circuitry to adjust, upon a UE entering or leaving the cell, the number of OFDM symbols used for transmission of the control channels.

In Example 12, the subject matter of any of Examples 1-11 can optionally include eight or more antennas.

In Example 13, the subject matter of any of Examples 1-112 can optionally include antennas configured in a sub-array based hybrid antenna architecture (HAA).

In Example 14, the subject matter of any of Examples 1-13 can optionally include wherein the downlink control channels are time-division duplexed with data channels within a subframe.

Example 15 includes an apparatus for for a User Equipment (UE), the apparatus comprising transceiver circuitry and hardware processing circuitry, the hardware processing circuitry to configure the transceiver circuitry to scan a number of orthogonal frequency division multiplexing (OFDM) symbols of a downlink subframe to detect the highest-energy OFDM symbol of the number of OFDM symbols; and decode a downlink control channel, in the highest-energy OFDM symbol, the downlink control channel being received in no more than one OFDM symbol from an evolved Node-B (eNB).

In Example 16, the subject matter of Example 15 can optionally include wherein the hardware processing circuitry further configures the transceiver circuitry to receive a value for the number of OFDM symbols to be scanned.

In Example 17, the subject matter of Example 16 can optionally include wherein the value for the number of OFDM symbols to be scanned is received in downlink control information (DCI).

In Example 18, the subject matter of Example 16 can optionally include wherein the value for the number of OFDM symbols to be scanned is received in a synchronization signal.

In Example 19, the subject matter of any of Examples 15-18 can optionally include wherein, when a relative distance to the eNB changes, the hardware processing circuitry is further to configure the transceiver circuitry to rescan the number of OFDM symbols to detect whether the highest-energy OFDM symbol has changed.

In Example 20, the subject matter of any of Examples 15-19 can optionally include wherein the hardware processing circuitry further configures the transceiver circuitry to receive uplink-formatted downlink control information (DCI) in a first OFDM symbol of the number of OFDM symbols and downlink DCI in a different OFDM symbol than the first OFDM symbol.

In Example 21, the subject matter of any of Examples 15-20 can optionally include wherein, when the UE does not receive a value for the number of OFDM symbols, the hardware processing circuitry is further to configure the transceiver circuitry to blind search up to a threshold number of OFDM symbols to detect control channel information.

In Example 22, the subject matter of any of Examples 15-21 can optionally include wherein the hardware processing circuitry includes a baseband processor to process the control channels.

In Example 23, a computer-readable medium stores instructions for execution by one or more processors to perform operations for communication by an Evolved Node-B (eNB), the operations to configure the one or more processors to: detect locations for user equipments (UEs) in a cell served by the eNB; and transmit downlink control channels to the UEs in a number of orthogonal frequency division multiplexing (OFDM) symbols of a downlink subframe, the number being set based on at least one of cell load and locations for the UEs.

In Example 24, the subject matter of Example 23 can optionally include wherein a downlink control channel of the plurality of control channels is transmitted in no more than one OFDM symbol.

In Example 25, the subject matter of any of Examples 23-24 can optionally include wherein the first OFDM symbol is transmitted according to a first demodulation reference signal (DM-RS) pattern and the second OFDM symbol is transmitted according to a second DM-RS pattern different from the first DM-RS pattern.

In Example 26, the subject matter of any of Examples 23-25 can optionally include wherein the eNB3 is configured for millimeter wave (mmWave) communication.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

What is claimed is:

1. An apparatus comprising processing circuitry configured to cause a base station (BS) to:

transmit a downlink signal that includes a plurality of orthogonal frequency division multiplexing (OFDM) symbols, wherein a time-frequency resource domain of the downlink signal includes transmissions of a plurality of downlink control channels, wherein transmission of a first of the plurality of downlink control channels occurs within a first group of one or more OFDM symbols from said plurality of OFDM symbols, wherein transmission of a second of the plurality of downlink control channels occurs within a second group of one or more OFDM symbols from said plurality of OFDM symbols, wherein said transmitting includes:
transmitting first downlink control information using first beamforming parameters, wherein the first downlink control information is transmitted on said first of the plurality of downlink control channels formed from a first set of one or more control channel elements (CCEs) with a localized or distributed mapping between resource element groups (REGs) and CCEs, wherein each of the REGs of said first of the plurality of downlink control channels spans a range of one OFDM symbol duration and 12 frequency subcarriers, wherein resource elements are reserved for only one REG within its respective range; and transmitting second downlink control information using second beamforming parameters, wherein the second downlink control information is transmitted on said second of the plurality of downlink control channels.

2. The apparatus of claim 1, wherein a downlink control channel size is adaptable from one to multiple OFDM symbols.

3. The apparatus of claim 1, wherein said plurality of OFDM symbols are in a subframe of the downlink signal, wherein the processing circuitry is further configured to cause the base station to:
dynamically adjust beam direction of control channels between successive subframes of the downlink signal, based on cell conditions in a cell served by the base station.

4. The apparatus of claim 1, wherein the first downlink control channel and a third of the plurality of downlink control channels are simultaneously transmitted in a first OFDM symbol of the first group of one or more OFDM symbols, and in respectively different beam directions.

5. The apparatus of claim 1, wherein a first OFDM symbol of the first group of one or more OFDM symbols is transmitted according to a first demodulation reference signal (DM-RS) for the first downlink control channel, wherein the first DM-RS is scrambled using a user equipment (UE)-specific sequence.

6. The apparatus of claim 1, wherein the second beamforming parameters are configured for low geometry transmission, wherein the second control channel is transmitted with a higher aggregation level than the first control channel.

7. The apparatus of claim 1, wherein the processing circuitry is further configured to cause the base station to:
transmit the first group of one or more OFDM symbols to a first group of user equipments (UEs) close to a cell edge and the second group of one or more OFDM symbols to a second group of UEs further from the cell edge than the first group of UEs.

8. The apparatus of claim 1, wherein the first downlink control channel and a third of the plurality of downlink control channels are simultaneously transmitted in a first OFDM symbol of the first group, and in respectively different beam directions.

9. The apparatus of claim 1, wherein the processing circuitry is further configured to cause the base station to transmit channel state information reference signals (CSI-RSs), to train downlink beamforming.

10. The apparatus of claim 1, wherein the processing circuitry is further configured to cause the base station to:
adjust, upon a UE entering or leaving a cell, a number of the plurality of OFDM symbols used for transmission of the control channels.

11. The apparatus of claim 1, further comprising:
antennas configured in a sub-array based hybrid antenna architecture (HAA).

12. The apparatus of claim 1, wherein the downlink control channels are time-division multiplexed and frequency division multiplexed with data channels within a downlink subframe of the downlink signal.

13. A non-transitory memory medium storing program instructions, wherein the program instructions are executable by a processor, wherein the program instructions, when executed by the processor, cause a user equipment (UE) to:
receive a downlink signal that includes a plurality of orthogonal frequency division multiplexing (OFDM) symbols, wherein a time-frequency resource domain of the downlink signal includes a plurality of downlink control channels, wherein a first of the plurality of downlink control channels occurs within a first group of one or more OFDM symbols from said plurality of OFDM symbols, wherein a second of the plurality of downlink control channels occurs within a second group of one or more OFDM symbols from said plurality of OFDM symbols,
wherein first downlink control information has been beamformed using first beamforming parameters, wherein the first downlink control information is received on said first of the plurality of downlink control channels formed from a first set of one or more control channel elements (CCEs) with a localized or distributed mapping between resource element groups (REGs) and CCEs, wherein each of the REGs of said first of the plurality of downlink control channels spans a range of one OFDM symbol duration and 12 frequency subcarriers, wherein resource elements are reserved for only one REG within its respective range; and
wherein second downlink control information has been beamformed using second beamforming parameters, wherein the second downlink control information is received on said second of the plurality of downlink control channels.

14. The non-transitory memory medium of claim 13, wherein a downlink control channel size is adaptable from one to multiple OFDM symbols.

15. The non-transitory memory medium of claim 13, wherein a first OFDM symbol of the first group of one or more OFDM symbols accords with a first demodulation reference signal (DM-RS) for the first downlink control channel, wherein the first DM-RS is scrambled using a UE-specific sequence.

16. The non-transitory memory medium of claim 13, wherein the first downlink control channel is carried in a first downlink control channel region in the first group of one or more OFDM symbols, wherein the second downlink control channel is carried in a second downlink control channel region in the second group of one or more OFDM symbols.

17. The non-transitory memory medium of claim 13, wherein the program instructions, when executed by the processor, cause the UE to:
train a receive beam using received channel state information reference signals (CSI-RSs), wherein the first downlink control channel is received from a first OFDM symbol of the first group of one or more OFDM symbols using the receive beam.

18. An apparatus comprising a processor configured to cause a user equipment (UE) to:
receive a downlink signal that includes a plurality of orthogonal frequency division multiplexing (OFDM) symbols, wherein a time-frequency resource domain of the downlink signal includes a plurality of downlink control channels, wherein a first of the plurality of downlink control channels occurs within a first group of one or more OFDM symbols from said plurality of OFDM symbols, wherein a second of the plurality of downlink control channels occurs within a second group of one or more OFDM symbols from said plurality of OFDM symbols,
wherein first downlink control information has been beamformed using first beamforming parameters, wherein the first downlink control information is received on said first of the plurality of downlink control channels formed from a first set of one or more control channel elements (CCEs) with a localized or distributed mapping between resource element groups (REGs) and CCEs, wherein each of the REGs of said first of the plurality of downlink control channels spans a range of one OFDM symbol duration and 12 frequency subcarriers, wherein resource elements are reserved for only one REG within its respective range; and wherein second downlink control information has been beamformed using second beamforming parameters, wherein the second downlink control information is received on said second of the plurality of downlink control channels.

19. The apparatus of claim 18, wherein a downlink control channel size is adaptable from one to multiple OFDM symbols.

20. The apparatus of claim 18, wherein the processor is further configured to cause the UE to:

train a receive beam using received channel state information reference signals (CSI-RSs), wherein the first downlink control channel is received from a first OFDM symbol of the first group of one or more OFDM symbols using the receive beam.

\* \* \* \* \*